United States Patent
Ayambem

(10) Patent No.: US 6,790,277 B2
(45) Date of Patent: Sep. 14, 2004

(54) LIGHTWEIGHT JOINT TREATMENT FORMULATION

(75) Inventor: Amba Ayambem, Suwanee, GA (US)

(73) Assignee: National Gypsum Properties, LLC, Charlotte, NC (US)

( * ) Notice: Subject to any disclaimer, the term of this patent is extended or adjusted under 35 U.S.C. 154(b) by 148 days.

(21) Appl. No.: 10/262,235

(22) Filed: Oct. 1, 2002

(65) Prior Publication Data

US 2004/0060480 A1 Apr. 1, 2004

(51) Int. Cl.$^7$ .............................................. C04B 14/28

(52) U.S. Cl. ................. 106/795; 106/817; 106/DIG. 2; 524/426

(58) Field of Search ................................ 106/795, 817, 106/DIG. 2; 524/426

(56) References Cited

U.S. PATENT DOCUMENTS

| | | | |
|---|---|---|---|
| 4,661,161 A | 4/1987 | Jakacki et al. | 106/112 |
| 5,494,947 A | 2/1996 | Kaplan | 523/122 |
| 5,512,616 A | 4/1996 | Podlas | 524/18 |
| 5,653,797 A | 8/1997 | Patel | 106/781 |
| 5,746,822 A | 5/1998 | Espinoza et al. | 106/785 |
| 5,779,786 A | 7/1998 | Patel | 106/781 |
| 6,228,163 B1 | 5/2001 | Espinoza et al. | 106/778 |
| 6,295,794 B1 | 10/2001 | Nordt et al. | 53/467 |
| 6,402,832 B1 | 6/2002 | Vijayendran et al. | 106/778 |
| 6,406,537 B1 | 6/2002 | Immordino | 106/778 |
| 6,436,185 B1 | 8/2002 | Ayambem et al. | 106/793 |

*Primary Examiner*—Paul Marcantoni
(74) *Attorney, Agent, or Firm*—Ice Miller; Anthony Nimmo

(57) ABSTRACT

Wallboard joint compound compositions comprising water, calcium carbonate, a polyether siloxane copolymer, and a styrene-butadiene polymer are disclosed. The joint compound compositions display significantly reduced cratering, reduced shrinking, greater sag resistance, and excellent workability.

16 Claims, No Drawings

LIGHTWEIGHT JOINT TREATMENT FORMULATION

FIELD OF THE INVENTION

The invention relates to joint compound compositions suitable for use in wallboard applications.

BACKGROUND OF THE INVENTION

Interior walls of commercial and residential buildings are often constructed using gypsum wallboards, sometimes referred to as "drywall". The wallboards are affixed to a support structure such as wooden frames. In order to attach the wallboards, screws or nails are often used. The gaps formed between adjacent wallboards are typically called "joints".

In order to achieve a smooth, visually appealing surface, the joints between boards, cracks, screw holes, and/or nail holes must be concealed. Wallboard joint compound is commonly used to cover and finish gypsum wallboard joints, cornerbead, and screw or nail holes. Joint compound can be spread over mesh or tape used to connect wallboards. It may also be used to patch and texture interior walls.

Joint compounds are typically applied in thin layers using a trowel or other straight edged tool. Multiple layers may be applied in order to obtain a smooth, attractive finished wall. Each layer is allowed to dry prior to application of the next layer.

Joint compounds are commercially available as dry or wet mixes. Dry mixes require the addition of water and mixing to afford a smooth product.

An array of joint compounds have been sold commercially, described in printed publications, and have been the subject of patent applications. It is common to use a filler (e.g., calcium carbonate, calcium sulfate hemihydrate, or calcium sulfate dihydrate), thickener, preservative, and a binder, as well as various other additives to produce a joint compound. An example of such a joint compound is suggested in U.S. Pat. No. 5,653,797.

Many joint compounds are of the "drying" or "setting report" type. Drying-type joint compounds contain calcium carbonate ($CaCO_3$; i.e., limestone) and/or calcium sulfate dihydrate ($CaSO_4$ $2H_2O$) and/or talc ($Mg_3Si_4O_{10}(OH)_2$ or $3MgO_4SiO_2$ $H_2O$). Prior to use (generally during manufacturing), these components and a binder (along with several other ingredients) are mixed for a specific time with water. The drying-type joint compound thus produced has a high ionic content and basic pH. After application, when the compound dries (i.e., water evaporates), a dry, relatively hard cementitious material remains. The calcium sulfate dihydrate and calcium carbonate may comprise a substantial portion of what is sometimes referred to as the filler component.

Many conventional drying-type joint compounds undergo shrinkage upon drying, which makes it difficult to achieve a smooth wall surface. Shrinkage can be particularly troublesome when a second coat of compound is applied over a previous coat that is not completely dried.

To avoid various disadvantages of the drying-type of joint compound, compounds of the "setting type" have been developed. A setting-type joint compound generally includes calcium sulfate hemihydrate ($CaSO_4$ $½H_2O$, also referred to as calcined gypsum). (See U.S. Pat. No. 5,653,797.) To produce calcined gypsum, calcium sulfate dihydrate is converted from raw gypsum to the hemihydrate state via a suitable calcination process. A gypsum calcination process removes one and one-half molecules of water from each calcium sulfate dihydrate gypsum molecule. The hemihydrate form of calcium sulfate is substantially more soluble in water than the dihydrate form of calcium sulfate. The calcium sulfate hemihydrate may comprise a substantial portion of what is sometimes referred to as the filler component in a setting-type joint compound.

During use in a setting-type joint compound, the calcium sulfate hemihydrate is rehydrated to the dihydrate state via the addition of water. This rehydration process normally takes place over a fairly short period of time. Accordingly, it has been extremely difficult to produce a setting-type joint compound comprising hemihydrate gypsum pre-mixed with water, because the product would set in its storage container. Thus, joint compounds of the setting-type have generally had to be supplied in the powder form.

Ready-mixed, setting-type joint compounds are also known. For example, Jakacki et al. U.S. Pat. No. 4,661,161 suggests a setting-type joint compound comprising an aqueous slurry of calcium sulfate hemihydrate and a set retarding agent formed of two ingredients: an organic, proteinaceous retarder and a chelating agent, e.g., selected from diethylene triamine pentaacetic acid, ethylene diamine tetraacetic acid, and salts thereof. This patent indicates that the compound has an adequately long shelf life for commercialization, and that when mixed with an accelerator that the joint compound hydrates after a period of time to form a set material having acceptable joint compound properties. However, it is believed that joint compounds of the setting, ready-mix type have not been successfully commercially employed due to the need to find a suitable retarding agent and a suitable accelerator to overcome the retarding agent.

Setting-type joint compounds have the advantage of having generally quicker finishing times (setting time) than drying-type joint compounds. This is advantageous for the reasons stated above. Further, because setting joint compounds form a crystalline network upon setting (as opposed to merely drying), these compounds typically provide a strong, more durable bond between adjacent wallboard sheets than do drying-type joint compounds. However, because these compounds provide a strong crystalline network upon setting, the joint compound is often harder to sand to a smooth finish.

A calcium sulfate hemihydrate-based, setting-type joint compound can be combined with a calcium carbonate-based, drying-type joint compound to produce a joint compound having advantages of each individual type of compound. Such a hybrid joint compound can be used in applications typical of conventional drying-type and setting-type joint compounds.

One problem with this practice is that calcium carbonate acts as a calcium sulfate hemihydrate set accelerator. Thus, when a calcium sulfate hemihydrate-based, setting-type joint compound would, on its own, set in a time frame of about 210 minutes, its set time after having been mixed with a limestone-based drying-type joint compound (⅔ of hybrid joint compound by volume) is substantially reduced, to about 60 minutes. This drastic reduction in set time narrows in an unacceptable manner the working time window for finishers in the field to apply the compound.

One solution would seem to be the addition of a conventional set retarder to the drying-type joint compound. Others have disclosed retarding agents for use in certain other applications. However, although various types of retarders have been suggested, the purpose of the retarders, the final product, and the conditions under which the product is used (e.g., in wallboard manufacturing or cementing of pipes and casings of oil and gas wells) have differed substantially from the purpose, production conditions, and working conditions of joint compounds, particularly calcium carbonate-based, drying-type joint compounds.

For example, although wallboard manufacturers have used certain types of retarding agents, the purpose in that application is to prevent the immediate absorption of water and stiffening of the slurry during production, as well as to facilitate control of the slurry. In wallboard production, retarding agents are added to stabilize a stucco slurry for only a matter of seconds. It is understood that retarding agents are typically used in wallboard production at an extremely low rate, for example at about 0.0007 weight percent (e.g., in a 1400 pound batch, about 30 grams of retarder could typically be added).

When left in an aqueous, high ionic content, basic pH slurry system made up of such fillers as calcium carbonate and talc, conventional retarders completely lose their retarding potency towards calcium sulfate hemihydrate fairly rapidly, for example in as short as one day.

U.S. Pat. No. 6,436,185 discloses joint treatment formulations containing water, calcium carbonate, and a water-soluble polymeric set retarder formed from a monomer having two or more carboxyl groups.

U.S. Pat. No. 6,406,537 suggests a composition comprising calcined gypsum, trimetaphosphate ion, and a water-soluble linear polymer formed by the addition reaction of ethylene oxide and/or alkoxy-substituted ethylene oxide with water, having enhanced strength when set and exhibiting high plasticity and workability.

U.S. Pat. No. 6,402,832 suggests a joint compound composition containing a water soluble functional polymer with either nitrogen or sulfonate (e.g. polyvinyl pyrrolidone (PVP)), and a solid epoxy resin. The additives increase flexibility, decrease drying time, and reduce the moisture content in the dried compound.

U.S. Pat. No. 6,295,794 offers a joint composition containing recycled materials from wallboards. As a result, wallboards do not have to be sent to landfills. The methods involve milling the wallboard material to the desired size, and combining it with a binder, a preservative and a Theological additive to form a flowable joint compound mixture with a desirable smooth consistency.

U.S. Pat. No. 6,228,163 describes a two part joint compound system that contains calcium sulfate hemihydrate, and lacks clay. One part includes an in-situ acidic acrylate copolymer thickener with the calcium sulfate hemihydrate, along with a non-calcium bearing phosphate set preventer. The second part includes a set initiator compound having a cation with a log K value greater than calcium ions. The second part is mixed with the first part when setting is desired.

U.S. Pat. Nos. 5,779,786 and 5,746,822 offer the preparation of a ready-mixed setting type joint compound that sets upon addition of an accelerator such as zinc sulfate. The compound can be used as a drying type joint compound if the accelerator is not added. The presence of a phosphate set retarder in the joint compound prevents it from setting for at least 175 days in the absence of an accelerator.

U.S. Pat. Nos. 5,653,797 and 5,512,616 suggest the preparation of joint compounds containing unborated hydroxypropylguar or a blend of an unborated hydroxypropylguar and 1–3% of a cellulose ether. The patent describes the presence of borates in wallboard joint compounds as being incompatible with the use of guar polymers as thickening agents.

U.S. Pat. No. 5,494,947 suggests the use of a joint compound that remains flexible upon curing. The compound comprises an acrylate resin, an incan preservative, a polyamide fiber, a latex, a surfactant, a plasticizer, a filler a pyrithione, and an ester alcohol.

Despite the various joint compound compositions currently in use, there remains a need for compositions that have reduced cratering effects, reduced shrinking, improved sag resistance, and improved workability.

SUMMARY OF THE INVENTION

Wallboard joint compound compositions comprising water, calcium carbonate, a polyether siloxane copolymer, and a styrene-butadiene polymer have been found to exhibit superior physical properties as compared to those of existing commercial products. The addition of polyether siloxane polymer is believed to reduce attractive forces between the particles in the joint compound compositions.

DETAILED DESCRIPTION OF THE INVENTION

In order to address the shortcomings of the joint treatment formulas that are currently available, research was undertaken to develop a lightweight joint treatment formula that displayed significantly reduced cratering, reduced shrinking, greater sag resistance, and excellent workability.

The cratering aspect was addressed by attempting to understand its cause. The current understanding is that, in the absence of other interactions, cratering in high solids systems such as tape joint compound is primarily a result of the Van der Waals attractive forces that are present between the inorganic particles (for example, limestone, clay, and mica) that are contained in a joint compound slurry. These forces are sufficiently strong such that interacting particles adhere one to another in any orientation thereby effectively creating a resistance to such lateral motions as swiping with a trowel. As a result, voids or craters become evident on the surface of the joint compound.

One way to overcome these voids, or pockmarks as they are commonly called in the industry, is to weaken the attractive interaction between the particles. The addition of a small amount of polyether siloxane polymer is believed to be effective at reducing cratering in the compositions. Examples of such polymers include the Tego company's WET KL 245, Dow Corning's Q2-5211 or FF-400, and GE's SF1288. These polymers are believed to impart dispersing properties that reduce the inter-particle attractive forces. Additionally, addition of the polymers was found to enhance the composition's slip properties, thus significantly improving the composition's workability.

A functionalized styrene-butadiene polymer (powder) was added in an effort to achieve a specific rheology and to improve sag resistance by increasing the product's yield stress.

Joint compound compositions can be a "ready-mix" formulation (ready to use, does not require addition of water) or a dry formulation (requires addition of water prior to use).

Therefore, one embodiment of the invention is directed towards joint compound compositions comprising water, calcium carbonate, a polyether siloxane copolymer, and a styrene-butadiene polymer.

The concentration of the various components can generally be any concentration that will afford a joint compound suitable for home and industrial use.

Generally, the concentration of water can be at least about 30 weight percent based on the weight of the composition. It is presently preferred that the concentration of water be about 30 weight percent to about 50 weight percent based on the weight of the composition. Specific examples of the concentration of water include about 30 weight percent, about 35 weight percent, about 40 weight percent, about 45 weight percent, about 50 weight percent, and ranges between any two of these values.

Generally, the concentration of calcium carbonate can be at least about 25 weight percent based on the weight of the composition. It is presently preferred that the concentration of calcium carbonate be about 25 weight percent to about 60 weight percent based on the weight of the composition. Specific examples of the concentration of calcium carbonate include about 25 weight percent, about 30 weight percent, about 35 weight percent, about 40 weight percent, about 45 weight percent, about 50 weight percent, about 55 weight percent, about 60 weight percent, and ranges between any two of these values.

Generally, the concentration of polyether siloxane copolymer can be at least about 0.01 weight percent. It is presently preferred that the concentration of polyether siloxane copolymer be about 0.01 weight percent to about 0.50 weight percent based on the weight of the composition. Specific examples of the concentration of calcium carbonate include about 0.01 weight percent, about 0.10 weight percent, about 0.20 weight percent, about 0.30 weight percent, about 0.40 weight percent, about 0.50 weight percent, and ranges between any two of these values.

Generally, the concentration of styrene-butadiene polymer can be at least about 0.5 weight percent. It is presently preferred that the concentration of styrene-butadiene polymer be about 0.5 weight percent to about 5 weight percent based on the weight of the composition. Specific examples of the concentration of styrene-butadiene polymer include about 0.5 weight percent, about 1 weight percent, about 1.5 weight percent, about 2 weight percent, about 2.5 weight percent, about 3 weight percent, about 3.5 weight percent, about 4 weight percent, about 4.5 weight percent, about 5 weight percent, and ranges between any two of these values.

A presently preferred embodiment of the joint compound comprises water at about 43 weight percent, calcium carbonate at about 35 weight percent, polyether siloxane copolymer at about 0.1 weight percent, and styrene-butadiene polymer at about 1.9 weight percent based on the weight of the composition.

The compositions can further comprise various additives such as fillers, stabilizers, and colorings. For example, the compositions can further comprise mica, talc, perlite, starch, or cellulose ether.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of a Lightweight Joint Treatment Formulation

The following composition was prepared by blending all components together in a mixer until a smooth composition was obtained.

| Component | Mass (g) | Weight percent |
|---|---|---|
| Water | 1250.0 g | 43.0 |
| Preservatives | 5.0 g | 0.2 |
| Limestone | 1025.0 g | 35.3 |
| Mica | 140.0 g | 4.8 |
| Talc | 154.0 g | 5.3 |
| Perlite | 240.0 g | 8.3 |
| Polyether siloxane copolymer | 1.5 g | 0.1 |
| Latex (EVA emulsion) | 20.0 g | 0.7 |
| Latex (Powder, Rhoximat PSB 150) | 55.0 g | 1.9 |
| Cellulose ether | 16.0 g | 0.6 |

Example 2

Cratering Assays

Assessing the level of cratering was performed by placing a thoroughly mixed, measured amount of the formulated product on a wallboard and swiping over it with a doctor-blade. The film thickness produced was about 75 mil. Using an in-house grading system, it was found that, compared to every other commercially available Liteweight joint compound, this formulated product displayed an exceptionally low incidence of cratering. The grading system was on a scale of 1 to 10. After swiping the measured amount of joint compound with a doctor blade, the extent of cratering that resulted was assessed visually and given a comparative grade between 1 and 10. A higher numerical grade corresponds to a more desirable product having reduced incidence of craters.

Example 3

Sag Resistance Assays

Sag resistance was determined by first bringing the viscosity of a sample of the formulated product down to a 200 Brabender Unit viscosity (using a quarter inch spindle). A dimple, about 1-inch wide and about a quarter inch deep, was then made on a wallboard and into this dimple was added the low-viscosity joint compound (the top of the joint compound was flattened off with a knife). The board was then placed in a vertical position and the joint compound allowed to dry. An in-house grading system that assessed how far the joint compound rolled out of the dimple was used to determine its sag resistance. Sag resistance was determined using a visual assay. Upon drying, the extent of joint compound flow from the dimple was compared with standard in-house photos where a certain amount of flow corresponded to a specific grade. The grading system was from 1 to 10, with 10 designating no flow at all, which in turn implies the most sag resistance.

Example 4

Comparison of Joint Compound Formulations

Three joint compound formulations were obtained and tested. Blue lite is commercially available from National Gypsum Company. Plus3 (Lite) is commercially available from United States Gypsum Company. Testing was performed on commercial products "as opened" (A/O), with no additional stirring or mixing, and "re-mixed" (R/M) after opening.

Plus3 is reported by the manufacturer to contain >35 wt % limestone or dolomite or gypsum, >40 wt % water, <10 wt % expanded perlite, <10 wt % ethylene-vinyl acetate polymer or vinyl acetate polymer, <5 wt % attapulgite, <0.1 wt % vinyl acetate monomer, <0.1 wt % acetaldehyde, and <2 wt % crystalline silica.

| Formula | Blue lite | Plus3 (Lite) | Example 1 |
|---|---|---|---|
| Water separation | None | None | None |
| Weight A/O (lb/gal) | 8.00 | 9.95 | 8.42 |
| Weight R/M (lb/gal) | 8.07 | 10.02 | 8.80 |
| % solids | 54.93 | 53.98 | 53.53 |
| Viscosity A/O | 480 BU | 770 BU | 470 BU |
| Viscosity R/M | 470 BU | 740 BU | 520 BU |
| Addn water | — | 110 ml | — |
| Wt/Gal | — | 9.89 | — |
| Viscosity | — | 510 BU | — |
| % shrinkage (avg.) | 19.83, 19.64 (19.74) | 14.04, 15.25 (14.65) | 14.60, 13.86 (14.23) |
| Ring Cracks | None | None | None |
| Crack resistance | | | |
| 110° F. (43° C.) | 8 | 7.5 | 10 |
| 70° F. (21° C.) | 10 | 10 | 10 |
| Avg. tape bond | 100 | 90 | 95 |
| Sag resistance | 8 | 8 | 10 |
| Working/Application | 9 | 9 | 9 |
| Ease | 9 | 9 | 9+ |
| Cratering | 9 | 9 | 9+ |
| Wet edge | 9 | 8+ | 8+ |
| Open time | 8+ | 8+ | 8+ |

Viscosity was measured after 3 minutes. Average tape bond is the percent cohesive failure. The working and application, ease of application, wet edge, and open time measurements are determined subjectively on a comparative basis on a scale of 1 to 10. The material is used by an experienced finisher using a trowel and knife, and graded.

The inventive formulation left behind very few craters/pockmarks when 50 g of material was placed on a wallboard and smoothed over by a doctor's blade. This formulation also seemed to display a high yield stress i.e. it hardly sagged. When sufficient force was applied on the new product, it spread fairly easily and without much effort. This formulation will be very useful on ceilings and other overhead areas such as doors and windows.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A joint compound composition comprising water, calcium carbonate, a polyether siloxane copolymer, and a styrene-butadiene polymer.

2. The composition of claim 1, wherein the water is present at a concentration of at least about 30 weight percent based on the weight of the composition.

3. The composition of claim 1, wherein the water is present at a concentration of at about 30 weight percent to about 50 weight percent based on the weight of the composition.

4. The composition of claim 1, wherein the calcium carbonate is present at a concentration of at least about 25 weight percent based on the weight of the composition.

5. The composition of claim 1, wherein the calcium carbonate is present at a concentration of about 25 weight percent to about 60 weight percent based on the weight of the composition.

6. The composition of claim 1, wherein the polyether siloxane copolymer is present at a concentration of at least about 0.01 weight percent based on the weight of the composition.

7. The composition of claim 1, wherein the polyether siloxane copolymer is present at a concentration of about 0.01 weight percent to about 0.5 weight percent based on the weight of the composition.

8. The composition of claim 1, wherein the styrene-butadiene polymer is present at a concentration of at least about 0.5 weight percent based on the weight of the composition.

9. The composition of claim 1, wherein the styrene-butadiene polymer is present at a concentration of about 0.5 weight percent to about 5 weight percent based on the weight of the composition.

10. The composition of claim 1, wherein:

the water is present at a concentration of about 30 weight percent to about 50 weight percent based on the weight of the composition;

the calcium carbonate is present at a concentration of about 25 weight percent to about 60 weight percent based on the weight of the composition;

the polyether siloxane copolymer is present at a concentration of about 0.01 weight percent to about 0.5 weight percent based on the weight of the composition; and the styrene-butadiene polymer is present at a concentration of about 0.5 weight percent to about 5 weight percent based on the weight of the composition.

11. The composition of claim 1, wherein:

the water is present at a concentration of about 43 weight percent based on the weight of the composition;

the calcium carbonate is present at a concentration of about 35 weight percent based on the weight of the composition;

the polyether siloxane copolymer is present at a concentration of about 0.1 weight percent based on the weight of the composition; and the styrene-butadiene polymer is present at a concentration of about 1.9 weight percent based on the weight of the composition.

12. The composition of claim 1, further comprising mica.

13. The composition of claim 1, further comprising talc.

14. The composition of claim 1, further comprising perlite.

15. The composition of claim 1, further comprising starch.

16. The composition of claim 1, further comprising cellulose ether.

* * * * *